(12) United States Patent
Mathias et al.

(10) Patent No.: US 9,282,514 B2
(45) Date of Patent: Mar. 8, 2016

(54) METHODS AND APPARATUS FOR INTELLIGENT WIRELESS TECHNOLOGY SELECTION

(71) Applicant: Apple Inc., Cupertino, CA (US)

(72) Inventors: Arun G. Mathias, Sunnyvale, CA (US); Matthew S. Klahn, Cupertino, CA (US); Vikram B. Yerrabommanahalli, Sunnyvale, CA (US); Anush Nadathur, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/768,508

(22) Filed: Feb. 15, 2013

(65) Prior Publication Data

US 2013/0210415 A1 Aug. 15, 2013

Related U.S. Application Data

(60) Provisional application No. 61/599,338, filed on Feb. 15, 2012.

(51) Int. Cl.
*H04M 3/00* (2006.01)
*H04W 52/02* (2009.01)
*H04W 48/18* (2009.01)
*H04W 88/06* (2009.01)
*H04W 76/02* (2009.01)

(52) U.S. Cl.
CPC .......... *H04W 52/0209* (2013.01); *H04W 48/18* (2013.01); *H04W 76/02* (2013.01); *H04W 88/06* (2013.01); *Y02B 60/50* (2013.01)

(58) Field of Classification Search
CPC ..... H04W 48/18; H04W 88/06; H04W 52/06; H04W 52/0209; H04W 76/02; H04M 1/00; H04B 1/18; Y02B 60/50
USPC ................... 455/416.1, 418, 552.1, 574, 566
See application file for complete search history.

(56) References Cited

U.S. PATENT DOCUMENTS

| 6,754,194 | B2 | 6/2004 | Ramaswamy et al. |
| 8,406,160 | B2 * | 3/2013 | Sureshchandran et al. ... 370/310 |
| 2008/0057912 | A1 | 3/2008 | Deprun |

(Continued)

FOREIGN PATENT DOCUMENTS

| JP | 2005521331 A | 7/2005 |
| JP | 2006295312 A | 10/2006 |

(Continued)

OTHER PUBLICATIONS

PCT Application No. PCT/US2013/026490—International Search Report and Written Opinion dated Sep. 25, 2013.

(Continued)

*Primary Examiner* — Amancio Gonzalez
(74) *Attorney, Agent, or Firm* — Downey Brand LLP

(57) ABSTRACT

Methods and apparatus for intelligently selecting and operating one or more air interfaces of a mobile wireless device for e.g., call setup time reduction. In one embodiment, operation of a high speed cellular interface is selectively adjusted or disabled or switched out when not required so as to minimize call setup times by, e.g., using a different cellular interface to receive pages. In one implementation, the wireless device includes a high-speed cellular interface, a lower-speed cellular interface, and a WLAN (e.g., Wi-Fi) interface.

20 Claims, 4 Drawing Sheets

(56) References Cited

U.S. PATENT DOCUMENTS

| | | |
|---|---|---|
| 2008/0113692 A1 | 5/2008 | Zhao et al. |
| 2009/0068969 A1 | 3/2009 | Lindoff et al. |
| 2009/0207808 A1 | 8/2009 | McCann et al. |
| 2009/0239574 A1 | 9/2009 | Hussain |
| 2010/0273486 A1* | 10/2010 | Kharia et al. ............... 455/436 |
| 2011/0003590 A1* | 1/2011 | Yoon et al. ............... 455/432.1 |
| 2011/0149764 A1 | 6/2011 | Wietfeldt et al. |
| 2012/0142358 A1 | 6/2012 | Ishihara |
| 2012/0190402 A1 | 7/2012 | Whang et al. |
| 2012/0202561 A1 | 8/2012 | Robinett |
| 2012/0303990 A1 | 11/2012 | Nanda et al. |
| 2012/0322448 A1 | 12/2012 | Chin et al. |
| 2012/0329514 A1 | 12/2012 | Noh et al. |
| 2013/0058277 A1 | 3/2013 | Wang et al. |
| 2013/0210481 A1 | 8/2013 | Sane |

FOREIGN PATENT DOCUMENTS

| | | |
|---|---|---|
| JP | 2009194805 A | 8/2009 |
| JP | 2009267882 A | 11/2009 |
| JP | 2010028416 A | 2/2010 |
| JP | 2010166355 A | 7/2010 |
| KR | 20040099340 A | 11/2004 |
| KR | 20080020573 A | 3/2008 |

OTHER PUBLICATIONS

Taiwanese Patent Application No. 102105626—Office Action dated Jul. 30, 2014.
Japanese Patent Application No. 2014-557846—First Office Action dated Sep. 7, 2015.
Korean Patent Application No. 10-2014-7025545—Preliminary Rejection dated Oct. 30, 2015.

* cited by examiner

METHODS AND APPARATUS FOR INTELLIGENT WIRELESS TECHNOLOGY SELECTION

PRIORITY AND RELATED APPLICATIONS

This application claims priority to co-owned and U.S. Provisional Patent Application Ser. No. 61/599,338 filed Feb. 15, 2012 of the same title, which is incorporated herein by reference in its entirety.

This application is also related to co-owned and co-pending U.S. patent application Ser. No. 13/492,413 filed Jun. 8, 2012 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright tights whatsoever.

BACKGROUND

1. Technical Field

The present disclosure relates generally to the field of wireless communication, and data networks. More particularly, in one exemplary embodiment, the disclosure is directed to methods and apparatus for intelligently selecting device wireless access technology based on e.g., prevailing device and network operating conditions.

2. Description of Related Technology

Within telecommunications, devices having multiple air interfaces (e.g., 2G/3G, LTE/LTE-A) will seek to maximize the efficiency of the wireless network. Specifically, a cellular device will always use the available network with the highest speed. For example, a device that has a Global System for Mobile Communications (GSM) connection (2G) will always handover to a Universal Mobile Telecommunications System (UMTS) connection (3G) when possible. This behavior ensures that limited network resources are being most efficiently used.

Recent standards, such as the Long Term Evolution (LTE), LTE-Advanced (LTE-A) cellular standards provide very high data rates. However, LTE standards are data only; i.e., LTE does not natively handle voice traffic. As a brief aside, voice traffic is very sensitive to time delay (latency). Data only technologies (e.g., LTE, CDMA-IXDO, etc.) offer much faster data rates, but cannot guarantee latency requirements that would be required to support voice traffic. Consequently, many data-only technologies are paired with a voice-capable technology, specifically to handle voice calls. At all other times, the data-only technology is used, thereby at least ostensibly optimizing the overall network operation. However, in the case of call setup time, the foregoing approach is less than optimal, since a device "camped" on the data only (e.g., LTE) interface will need to hand over to the voice capable technology before setting up a voice call, thereby increasing latency and reducing overall user experience with the device.

Additionally, artisans of ordinary skill in the related arts will recognize that overall power consumption can have significant impact on user experience for mobile device consumers. Devices which consume less power can operate longer and have greater standby longevity; thus, metrics such as so-called "battery life", "standby time" and "talk time" are critical factors that consumers consider when purchasing new equipment.

SUMMARY

The present disclosure provides, inter alia, improved apparatus and methods for intelligent selection and operation of radio access technologies within a mobile device.

A mobile apparatus is disclosed. In one embodiment, the mobile apparatus includes: a cellular wireless transceiver operable in at least a first mode and a second mode; a processor in signal communication with the cellular wireless transceiver; and logic in communication with the processor. In one exemplary embodiment, the logic is configured to: determine an operational state of the processor; when the operational state is a first operational state, operate the cellular wireless transceiver in the first mode; and otherwise, operate the cellular wireless transceiver in the second mode.

In one variant, the first mode and second mode include first and second system selection preferences respectively, and each of the first and second system selection preferences include one or more rules configured to select between a plurality of radio access technologies. In one such implementation, the second system selection preference is a subset of the first system selection preference. For example, in one case, the first system selection preference consists of Global Standard for Mobile Communications (GSM), Wideband Code Division Multiple Access (WCDMA), and Long Term Evolution (LTE), and the second system selection preference consists of GSM, WCDMA. In another such example, the first system selection preference consists of Global Standard for Mobile Communications (GSM), Enhanced High Rate Packet Data (eHRPD), and Long Term Evolution (LTE), and the second system selection preference consists of GSM, and eHRPD.

In some variants, the operational state of the processor includes a power mode. Alternately, the operational state of the processor may be based on an association with an ad hoc network. In one such variant, the ad hoc network is a Wireless Local Area Network (WLAN).

In still other embodiments, the operational state of the processor includes a display mode.

A method for intelligently selecting and operating radio access technologies within a mobile device is disclosed. In one embodiment, the method includes: evaluating a first status of one or more wireless interfaces, where at least one of the one or more wireless interfaces includes a plurality of operational states; evaluating a second status of one or more operational states associated with a processor; and based at least in part on the first and second status and a set of operating rules configured to optimize device power consumption, selecting an operational state for the at least one of the one or more wireless interfaces.

In one variant, the set of operating rules includes one or more system selection preferences configured to select between a plurality of radio access technologies.

In other variants, the one or more wireless interfaces includes a plurality of cellular network interfaces and a second ad hoc network interface. In one such exemplary case, the plurality of cellular network interfaces includes at least a first voice-only cellular network interface, and a second data-only cellular network interface.

In still other variants, the one or more operational states associated with a processor include one or more power states. For example, the one or more power states may include at least a low power mode, and a normal operating mode.

A wireless apparatus is also disclosed. In one embodiment, the mobile apparatus includes: a plurality of cellular wireless interfaces; communication selection logic configured to automatically select one of the plurality of cellular wireless interfaces according to a system selection preference; a processor; and non-transitory computer readable apparatus including one or more instructions. In one exemplary embodiment, the instructions are configured to, when executed by the processor, cause the processor to: determine an operational state of the processor; when the processor is in a first operational state, set the system selection preference to a first configuration; and otherwise, set the system selection preference to a second configuration. In one variant, the first and second configurations are associated with different user experience characteristics.

In another such variant, the first configuration is associated with reduced power consumption, and the second configuration is associated with improved data link connectivity. In yet another exemplary variant, the first configuration is a subset of the second configuration. The wireless apparatus may further include an ad hoc network interface, where the processor is configured to select the ad hoc network interface for data transactions when the system selection preference is set to the first configuration.

A non-transitory computer-readable medium is further disclosed. In one embodiment, the non-transitory computer-readable medium includes instructions that are configured to: evaluate a first status of one or more wireless interfaces, where at least one of the one or more wireless interfaces includes a plurality of operational states; evaluate a second status of one or more operational states associated with a processor; and based at least in part on the first and second status and a set of operating rules configured to optimize device power consumption, select an operational state for the at least one of the one or more wireless interfaces.

A base station apparatus is additionally disclosed. In one embodiment, the base station apparatus is configured facilitate intelligent selection and operation of radio access technologies within a mobile device.

An ad hoc networking apparatus is also disclosed. In one embodiment, the ad hoc networking apparatus is configured facilitate intelligent selection and operation of radio access technologies within a mobile device.

Other features and advantages of the present disclosure will immediately be recognized by persons of ordinary skill in the art with reference to the attached drawings and detailed description of exemplary embodiments as given below.

All Figures© Copyright 2012-2013 Apple Inc. All rights reserved.

DETAILED DESCRIPTION OF THE DISCLOSURE

Reference is now made to the drawings, wherein like numerals refer to like parts throughout.

Overview

Methods and apparatus for intelligently selecting and operating one or more air interfaces (also known as radio access technologies or RATs) of a mobile wireless device, such as for e.g., power optimization and/or enhanced call setup, are disclosed. In one embodiment, operation of a high-speed cellular data interface is selectively adjusted or disabled when not required so as to minimize power consumption within the device, while not adversely impacting user experience. In one implementation, the wireless device includes the LTE/LTE-A high-speed cellular interface, a lower-speed 2G or 3G cellular interface, and a WLAN (e.g., Wi-Fi) interface. Depending on the status of the WLAN interface and other operational considerations such as mode of the device display, the high-speed interface is selectively disabled so as to mitigate unnecessary power consumption by that interface when its capacity is not required.

In one variant, the selection of radio access technology is conducted autonomously by the mobile device, without aid from the host cellular or WLAN network(s). In another variant, one or more of the networks participates in the selection process.

Various embodiments of the present disclosure also improve voice call (e.g., Circuit Switched Fall Back or CFSB) setup time in certain scenarios. Existing mobile devices are configured to remain camped on LTE/LTE-A when not in use; this significantly lengthens call set-up time for voice calls (i.e., the mobile device must handover to a voice-capable technology, since LTE is a data-only technology). Thus, as described hereinafter, the mobile device may connect to the WLAN interface for data operations, but remains camped on a voice-capable network for voice data. By camping on a voice-capable network, the mobile device can quickly initiate a voice call while still maintaining the requisite level of data service.

DESCRIPTION OF EXEMPLARY EMBODIMENTS

Exemplary embodiments of the present disclosure are now described in detail. While these embodiments are primarily discussed in the context of cellular networks including without limitation, second generation (2G) and third generation (3G) Universal Mobile Telecommunications System (UMTS) wireless networks, Long Term Evolution (LTE/LTE-A) fourth generation (4G) wireless networks, and WLANs such as those compliant with IEEE Std. 802.11, it will be recognized by those of ordinary skill that the present disclosure is not so limited.

In fact, the various embodiments described herein are useful in and readily adapted to any wireless network (or combination thereof) that can benefit from intelligent management of air interface or RAT selection and operation, as described herein.

Methods

Figure 1:
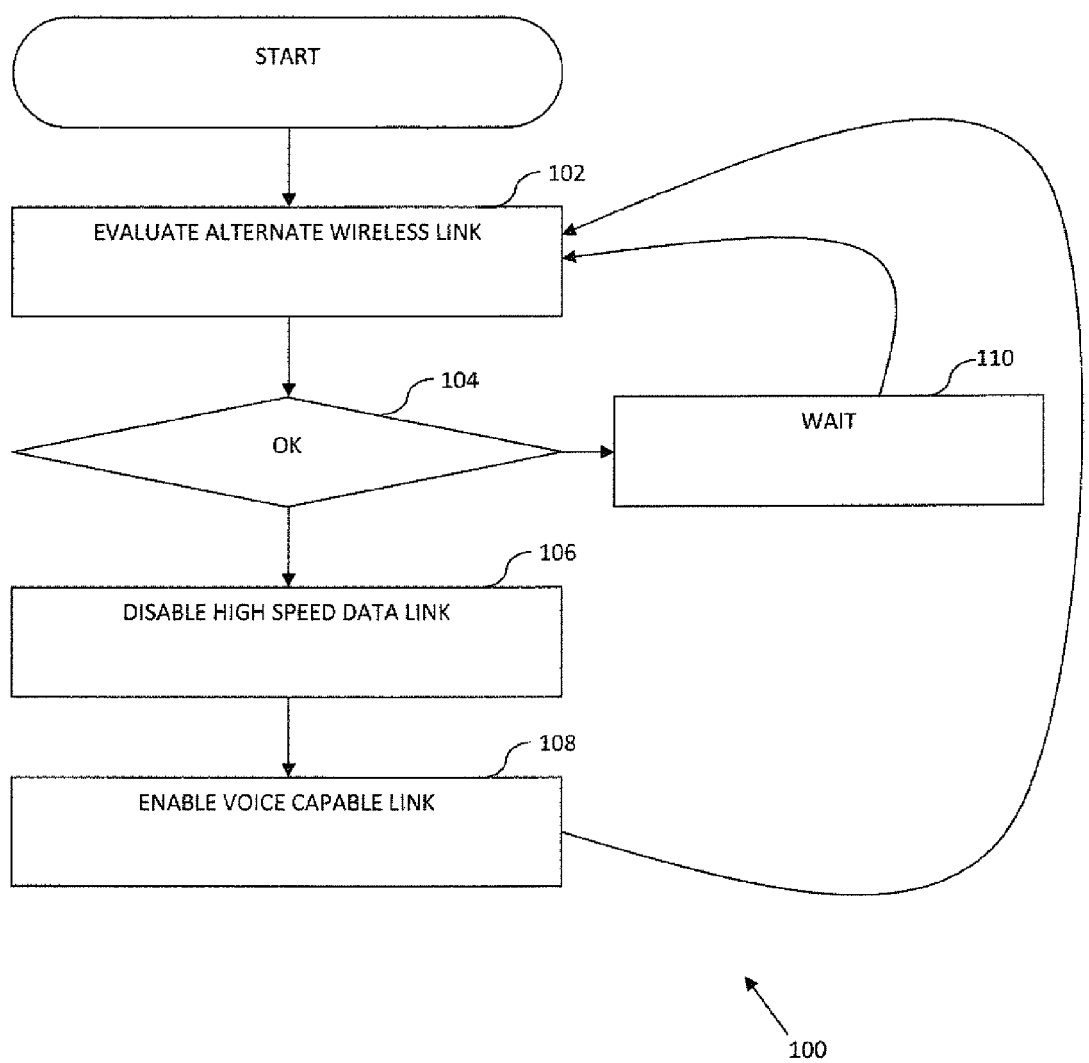
FIG. 1 is a logical flow diagram depicting one embodiment of a generalized method for selectively operating radio access technologies of a mobile device in accordance with the present disclosure.

FIG. 1 illustrates one embodiment of a generalized method 100 for selecting and managing RATs within a wireless mobile device according to the disclosure.

As shown in FIG. 1, the method 100 starts by evaluating the status of an alternate high speed data link to that of the cellular data interface (step 102). In one embodiment, the alternate link is an ad hoc WLAN (e.g., Wi-Fi) interface of the mobile device, and the primary (cellular) link is the LTE interface.

Artisans of ordinary skill in the related arts will readily appreciate that virtually any number of wireless interfaces may be evaluated. Common examples of wireless interfaces include e.g., cellular network technologies, wireless local area network (WLAN) technologies, personal area network (PAN) technologies, metropolitan area network (MAN), peer-to-peer technologies, ad hoc networking technologies, etc.

In other embodiments, other operational parameters may be considered. Common examples of such parameters may include e.g., power consumption modes, display modes, processor activity, software application requirements, user preferences, network preferences etc.

For example, in one exemplary case, if the WLAN interface is determined to be available and in operation (discussed in greater detail below) per step 102, then the method proceeds to step 104, wherein the status of one or more operational parameters are evaluated. In one implementation, these other operational parameters include the status of the display device (e.g., touch screen device) of the mobile user device, and the presence of any background data transfers or operations within the device. Assuming that the display is not in use, and there are no background data transfers under way, the method then proceeds to step 106, wherein the cellular data interface is temporarily disabled, and replaced instead with the high speed alternate data link. Additionally, in some embodiments, the device may preemptively handover to a voice-capable cellular connection (step 108).

In certain embodiments, the disabling of the cellular interface may be explicit. Explicit schemes for disabling the cellular interface force the existing cellular interface to close. For example, the device may explicitly close the existing data sessions and/or migrate the sessions to the high speed alternate data link. In one exemplary embodiment, the device moves a data session conducted over an LTE connection to a Wi-Fi connection. Depending on the degree of interoperation, this switchover (or handover) from LTE to Wi-Fi may be tightly coupled (e.g., the two network technologies can transfer connection/session information, also referred to hereinafter as "IP continuity"), or loosely coupled (e.g., the two network technologies do not communicate connection/session information, the switchover is performed with in-device mechanisms e.g., buffering, etc.).

In alternate embodiments, the disabling may be implicit. Under implicit schemes, the cellular interface is disabled at the next best opportunity. In other words, existing sessions are not closed unless there is a lull, termination, etc. In other examples, the device may change its selection operation.

In one exemplary embodiment, the device adjusts an internal system selection preference (SSP). As a brief aside, existing SSP implementations are configured to select the highest speed radio access technology that is available; for example, an SSP may be configured to transition between GSM, WCDMA, and LTE (GWL), based on availability. By adjusting the SSP to exclude e.g., LTE, various embodiments of the present disclosure can rely instead on an alternative interface (e.g., WLAN). Such adjustments will not affect the existing LTE session, but once the LTE session is closed, the device will not initiate another LTE connection.

Referring back to FIG. 1, if the aforementioned checks of step 104 do not pass (e.g., the display is active, there are no background data transfers, etc.), then the method proceeds to step 110, wherein a wait period is invoked before the method is re-entered again at step 102 (or alternately, the method is placed in a wait state until it is triggered by an event, such as activity associated with the WLAN connection indicating that the WLAN has recently changed states, or as yet another alternative the display has entered a sleep or inactive mode).

It will be appreciated from the foregoing that any number of different logical scenarios or criteria can be employed consistent with the present disclosure in order to re-enter the method 100.

In one exemplary embodiment, the foregoing determination is performed as part of a regular link evaluation. In some variants, the link evaluation may be performed on a periodic basis. In other common embodiments, link evaluation may be performed on an aperiodic basis; common examples of aperiodic schemes include, without limitation: opportunistically, event triggered, user triggered, application triggered, etc.

Moreover, those of ordinary skill in the related arts will readily appreciate that various embodiments of the present disclosure can be selectively tuned in accordance with various user preferences. For example, a user may enable or disable the aforementioned method in order to reduce power consumption/improve performance. In other cases, the user may fine tune the logic in accordance with their particular usage habits. For example, the scheme can be enabled/disabled around certain locations (home, office), and/or enabled/disabled for certain times (e.g., business hours, off peak hours, etc.). In other embodiments, the user may enable/disable the scheme based on running software applications (e.g., gaming applications, etc.).

Still other variants will be readily appreciated, given the contents of the present disclosure.

Example Operation

In the following discussion, an exemplary cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected to a Core Network, which includes additional controllers for resource management and in some cases access to other network systems (such as the Internet, other cellular networks, etc.).

Figure 2:
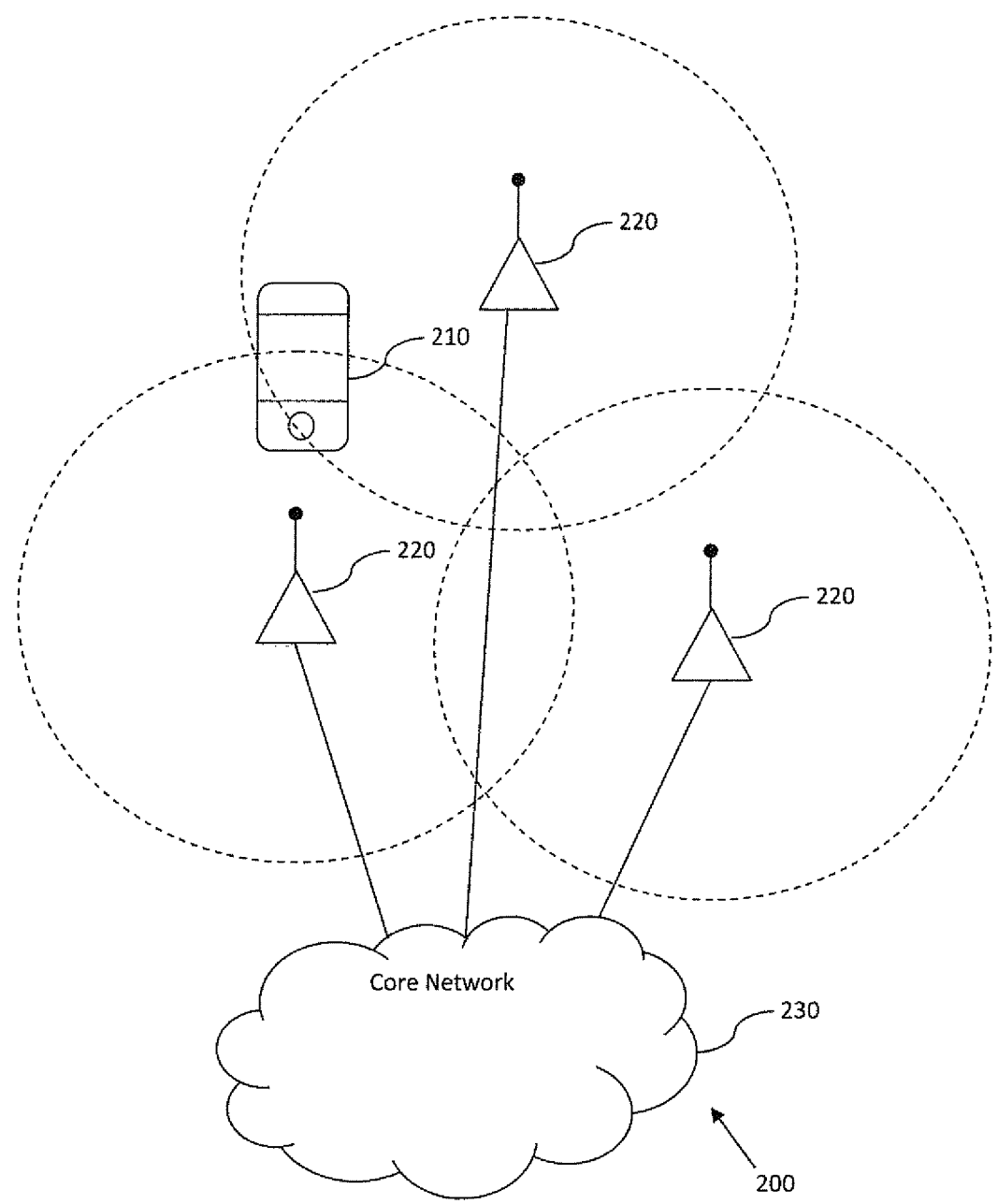
FIG. 2 is a logical block diagram illustrating one exemplary Long Term Evolution (LTE) cellular network useful with various embodiments of the present disclosure.

FIG. 2 illustrates one exemplary Long Term Evolution (LTE) cellular network 200, with user equipment (UEs) 210, operating within the coverage of the Radio Access Network (RAN) provided by a number of base stations (BSs) 220. The LTE base stations are commonly referred to as "Evolved NodeBs" (eNBs). The Radio Access Network (RAN) is the collective body of eNBs along with the Radio Network Controllers (RNC). The user interfaces to the RAN via the UE, which in many typical usage cases is a cellular phone or smartphone. However, as used herein, the terms "UE", "client device", and "user device" may include, but are not limited to, cellular telephones, smartphones (such as for example an iPhone™ manufactured by the Assignee hereof), personal computers (PCs) and minicomputers, whether desktop, laptop, or otherwise, as well as mobile devices such as handheld computers, PDAs, personal media devices (PMDs), or any combinations of the foregoing.

Each of the eNBs 220 are directly coupled to the Core Network 230 e.g., via broadband access. Additionally, in some networks the eNBs may coordinate with one another, via secondary access. The Core Network provides both routing and service capabilities. For example, a first UE connected to a first eNB can communicate with a second UE connected to a second eNB, via routing through the Core Network. Similarly, a UE can access other types of services e.g., the Internet, via the Core Network.

Figure 3:
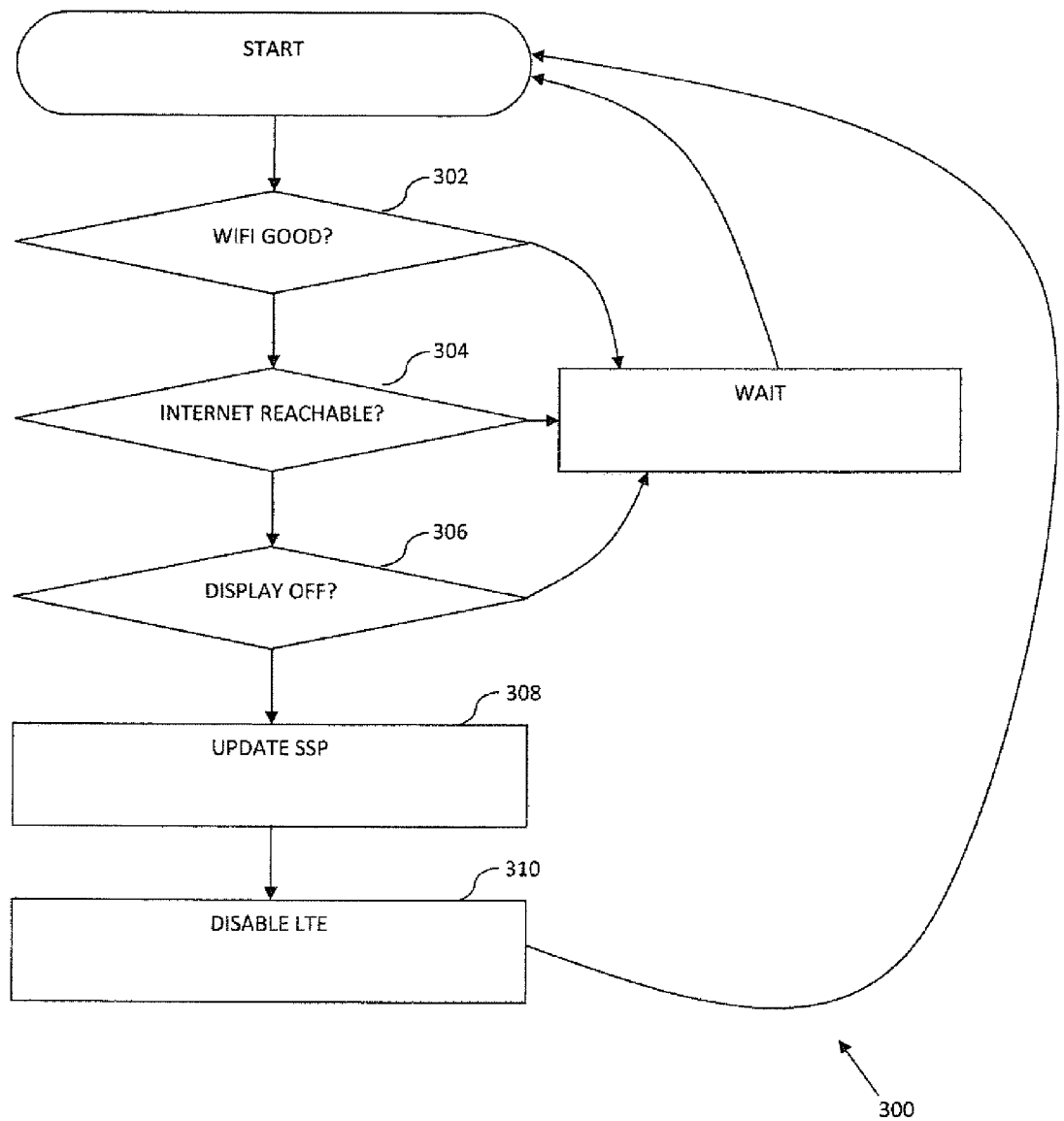
FIG. 3 is a logical flow diagram illustrating one exemplary implementation of the generalized methodology of FIG. 1, in the context of the LTE/LTE-A network of FIG. 2.

Referring now to FIG. 3, one particular variant of the method 100 (shown in FIG. 1 herein) is described in the exemplary context of the aforementioned LTE network of FIG. 2. Specifically, in this case, the high-speed cellular interface (e.g., LTE or LTE-A) is temporarily disabled, and the device "camps" on the indigenous 3G interface of the mobile UE in one of the following conditions: (i) an active association to a Wi-Fi access point (AP) exists (step 302), and the Internet is reachable (step 304); (ii) the mobile device display is off (not being utilized) (306), and no active data transfers are occurring in the background; and/or (iii) a blanket turn-off or other operation override is asserted with respect to the LTE/LTE-A interface (such as during a prescribed time period).

In one particular implementation, the active association with a Wi-Fi AP must minimally exceed a stability threshold i.e., a minimum length of time that the association has existed (so as to provide a hysteresis of sorts, and avoid inter alia a "ping pong" effect wherein the LTE interface is disabled, the Wi-Fi association then becomes disestablished or inoperative, and accordingly the LTE interface must be reestablished).

In addition, as referenced above, the availability or "reachability" of the Internet may be assessed to ensure that the mobile device can in fact access the Internet via the WLAN association. Reachability can be tested in any number of different ways, such as by probing one or more IP addresses, registering to a known domain, etc. For example, a mobile device may be required to indicate its IP address to the core network, such that the core network can route data accordingly (i.e., the mobile device's pushed data can be routed via an IP address).

Moreover, the received Wi-Fi signal strength and/or other channel parameter(s) can be evaluated. In one such scheme, fuzzy, deterministic, or other variables are specified (e.g., "good", "moderate", and "poor" thresholds or criteria), and these thresholds may also be user- or device-configurable e.g., via a Graphical User Interface (GUI), or via logic present within the mobile device). For instance, in one implementation, a Wi-Fi signal strength (e.g., Received Signal Strength Indication (RSSI) of a measured Wi-Fi beacon) value above a designated threshold ("good") for a prescribed period of time (e.g., G_Timer) will enable the Wi-Fi interface. Similarly, an RSSI value below a separate designated threshold ("moderate") for another period of time (e.g., M_timer) will enable the LTE link. By adjusting the appropriate timers and threshold values, the mobile device can associate with Wi-Fi APs easily (low RSSI "good" threshold for a short duration) or only during very good reception (high RSSI "good" threshold for a long duration), and switch frequently (high RSSI "moderate" threshold) or less frequently (low RSSI "moderate" threshold).

Moreover, with respect to the display activity and/or background data transfers, a hysteresis may be applied as well, such that the display must be off for a predetermined time, and/or data transfers must have ceased for a predetermined period of time, before the LTE interface will be disabled.

The foregoing "hysteresis" functions, while effective at mitigating deleterious effects on user experience resulting from the device logic "jumping" back and forth between LTE-enabled and LTE-not enabled modes, may also be applied based on criteria other than time (or in combination with temporal considerations). For example, the hysteresis may be event-driven, such as where the occurrence of an event once a particular state has been entered can be used as the basis for allowing the LTE-disable logic described above to proceed. In one such example, the Wi-Fi interface, once verified to be associated with an AP, may be required to transmit or receive a certain volume of data (or at a certain rate) before it is deemed to be "active" for purposes of the LTE enable/disable logic. As another example, a prescribed number of probes must be successfully sent and responded to before the LTE-disable function is enabled. As yet another example, an accelerometer within the device (if so equipped) must indicate no motion of the device (thereby ostensibly indicating no user interaction with the device), or a prescribed pattern of movement (e.g., consistent with a user walking with the device in their bag or pocket) before the logic is enabled.

It will also be appreciated that other examples of operation or use of the mobile device can be considered. For instance, in one alternate implementation, the presence or absence of an internally or externally generated "keep awake" or other signal or message (from e.g., other supervisory logic within the mobile device, or from the host LTE network infrastructure) is considered in determining whether to disable the LTE interface. In one such case, the core network may instruct the mobile device to a particular technology based on a so-called NSET signal. For example, the core network may force a UE to camp on a UMTS network, even where an LTE network may exist.

Furthermore, it is further appreciated that various modifications of the foregoing schemes may implement a wide range of considerations, including without limitation: signaling load, latencies due to RAT switching, IP continuity (i.e., during the switching process the device may not have continuous IP access), etc. Other factors or considerations in implementing the logic or "intelligence" described herein include for example and without limitation: (i) whether or not the mobile device is connected to an external power supply, such as a wired or wireless battery charger; (ii) when no 2G or 3G is present (thereby effectively providing the device with no LTE alternative); (iii) when no 3G is present, but 2G is available (or vice versa); (iv) when the 2G/3G system is "roaming" (roaming subscriber costs may be considered); (v) the presence or availability of signal strength indications (e.g., signal bars) and technology indicators (banners) on the mobile device GUI.

While the foregoing discussion has been described a particular family of interrelated technologies (e.g., Global Standard for Mobile Communications (GSM)(2G), Wideband Code Division Multiple Access (WCDMA)(3G), Long Term Evolution (LTE)(4G)); it is further appreciated that the various principles described herein are equally applicable to other technology families such as e.g., CDMA 1x, CDMA 1XEV-DO, LTE; GSM, enhanced High Rate Packet Data (eHRPD), and LTE (GHL), WiMAX (802.16), etc.

Moreover, it should be further noted that whereas the foregoing technology families are likely implementations, the aforementioned relationship between technologies is merely incidental, and not required for practice thereof.

Additionally, it is appreciated that in certain operational contexts, IP continuity can be maintained even while the device transitions between RATs; for example, IP continuity can be maintained for: (i) GSM, WCDMA, and LTE (GWL); and (ii) GSM, eHRPD, and LTE (GHL). Specifically, the core network can ensure that IP transactions are not interrupted even where the underlying RAT is changing.

In one salient example, the radio access technology RAT) is intelligently selected by the mobile device (or in alternate embodiments, a network entity) so as optimize power consumption and hence battery performance (including standby time) within the mobile device (step 308). Existing LTE devices consume significant amounts of electrical power by substantially always maintaining their baseband connected to the serving network, even when not required for high speed data transfers (for example, when an alternative data network such as Wi-Fi is available).

For example, consider devices that automatically implement a system selection preference (SSP) of GSM, WCDMA, LTE (abbreviated GWL) or GSM, eHRPD, LTE (abbreviated GHL). During operation, the device will select the highest speed RAT available to them, unless the network operator specifies otherwise (where the network operator controls one or more of the available RATs). Thus, a GWL device will automatically camp on the LTE network, if the LTE network is available. Unfortunately, while the application processor is asleep, the cellular baseband processor may still be registered to the host LTE network, even though the data connection is dormant or disconnected. Moreover, since the device is still "camped" on the LTE network, the LTE modem must periodically wake up to perform measurements, etc. This periodic wake up consumes appreciable amounts of electrical power in the mobile device. Finally, since LTE is a data-only technology, any voice call (received or initiated) requires the mobile device to handover to a voice-capable network.

Currently, device users only have gross control of LTE SSP (e.g., via an "Enable LTE" switch); however, this is essentially an "all or nothing" proposition, and does not account for myriad different operating conditions or scenarios. Accordingly, users must actively elect to increase power consumption and LTE link availability; the device does cannot perform this autonomously. Therefore, in one exemplary embodiment of the present disclosure, the LTE interface is disabled when high-speed data transfer (e.g., data rates that would necessitate use of the LTE air interface) is not necessary, or alternatively when such high data rates are achievable over another air interface such as a Wi-Fi or WiMAX interface of the mobile device (step 310).

In one embodiment, a supervisory process (e.g., a "communication center" logic) will change system selection preferences according to a prescribed set of operating rules designed to optimize device power consumption while not significantly detracting from user experience or other operational attributes. For example, in one embodiment, the system selection logic is modified under a number of different operational scenarios, including: (i) when the application processor is awake and Wi-Fi is the primary network route; and (ii) before the application processor enters into low power mode. In one such embodiment, the supervisory process may further update the system selection preference (SSP) to allow LTE interface operation in cases such as when: (i) the display of the mobile device is unlocked after leaving low power mode; and/or (ii) if association with a Wi-Fi access point is lost for whatever reason.

WLAN/Cellular Co-Existence

Currently, when Wi-Fi is the primary network route on the mobile device, the device baseband operates in a "data attached" state to the cellular network. Specifically, if a service requiring the interface (e.g., so-called "push" services) is active, (or is mandated for certain carriers/service providers) a cellular data connection is kept active through a data assertion. In particular, the system selection preference (SSP) will select the highest data capable network, such as LTE, which can consume significant amounts of power for link maintenance.

However, when the user is not actively using the data connection, only low-throughput traffic is used (e.g., push notifications). Consequently, existing mobile devices will remain in LTE, despite the relatively low data rate, and significantly higher power consumption (than alternative RATs). In contrast, various embodiments of the present disclosure can use technologies that are limited to lower data rates (such as those afforded by legacy 2G/3G cellular systems) to service the required throughput of the device, whereas a Wi-Fi interface is available to the device for high data rate operations.

Accordingly, under various embodiments of the disclosure, after the mobile device associates with a WLAN access point or node (e.g., Wi-Fi AP), and the desired level of connectivity is verified to be available (e.g., access to the Internet is truly reachable as verified via a network probe or other such mechanism), the system selection preference (SSP) is set to disable the comparatively higher consumption high speed cellular interface (e.g., SSP is set to GW or GH, thereby removing LTE).

In one implementation, the device logic periodically or continuously monitors the availability of the WLAN interface (such as using the aforementioned probe technique). When availability of the WLAN interface is lost (or the Internet is no longer reachable), the device logic changes the SSP to re-enable the high speed cellular link (e.g., to GWL or GHL, thereby adding LTE).

In one exemplary embodiment of the present disclosure, a supervisory entity (such as a "communication center" or "CommCenter") monitors low-power mode (LPM) entry/exit, and display transitions (e.g., the display element powering on or off). In one variant, the supervisory entity limits baseband processor activity (e.g., reduces or disables wake up functionality for non-essential notifications) while the application processor is asleep; additionally serving system indications (e.g., notifications received from the core network) will not automatically wake the application processor.

In one embodiment of the current disclosure, an application processor entering low power mode (LPM) triggers the SSP preference to be set to a lower power cellular mode (e.g., 3G). In one such variant, the change in SSP preference does not interfere with so-called "dormancy" requests. Specifically, dormancy allows logical packet switched (PS) service to the network without a physical link (the physical link is taken down by the network to save network resources, but the device still maintains the device state as if there is a data connection), consequently re-establishing the physical link can be made much faster than starting a new session. Furthermore, in one variant, the application processor is further configured to ignore non-essential wake up events. For example, the application processor can be configured to ignore serving system signaling (e.g., QMI_NAS_SERVING_SYSTEM_IND) while in LPM.

In various embodiments, an application processor exiting low power mode (LPM) does not necessarily need to reset the SSP (e.g., re-enable LTE) to allow high speed data operation. For instance, if the device display never turns on, it is likely that only low-throughput data is required. Similarly, if the display is never unlocked, it is highly unlikely to have any high-speed data requests (certain real time data applications may be exceptions (e.g., video calls, etc.)). Finally, it is further appreciated that where the device is associated to a Wi-Fi access point, there is no need for high speed data service to be provided over the cellular data interface.

Finally, responsive to (i) the application processor being woken, (ii) the screen being unlocked or turned on, and/or (iii) a loss of Wi-Fi capability, the supervisory entity can restore the SSP to include high speed data services (re-enabling LTE) in order to provide high speed data capability. Moreover, it is further appreciated, that certain conditions, may not necessitate a change to SSP. For example, if the device is woken up and the screen unlock was merely to accept a mobile device voice call; the SSP rules may be left unchanged. For example, the supervisory entity may further assess usage (e.g., voice calls) before changing the SSP.

Apparatus

Figure 4:
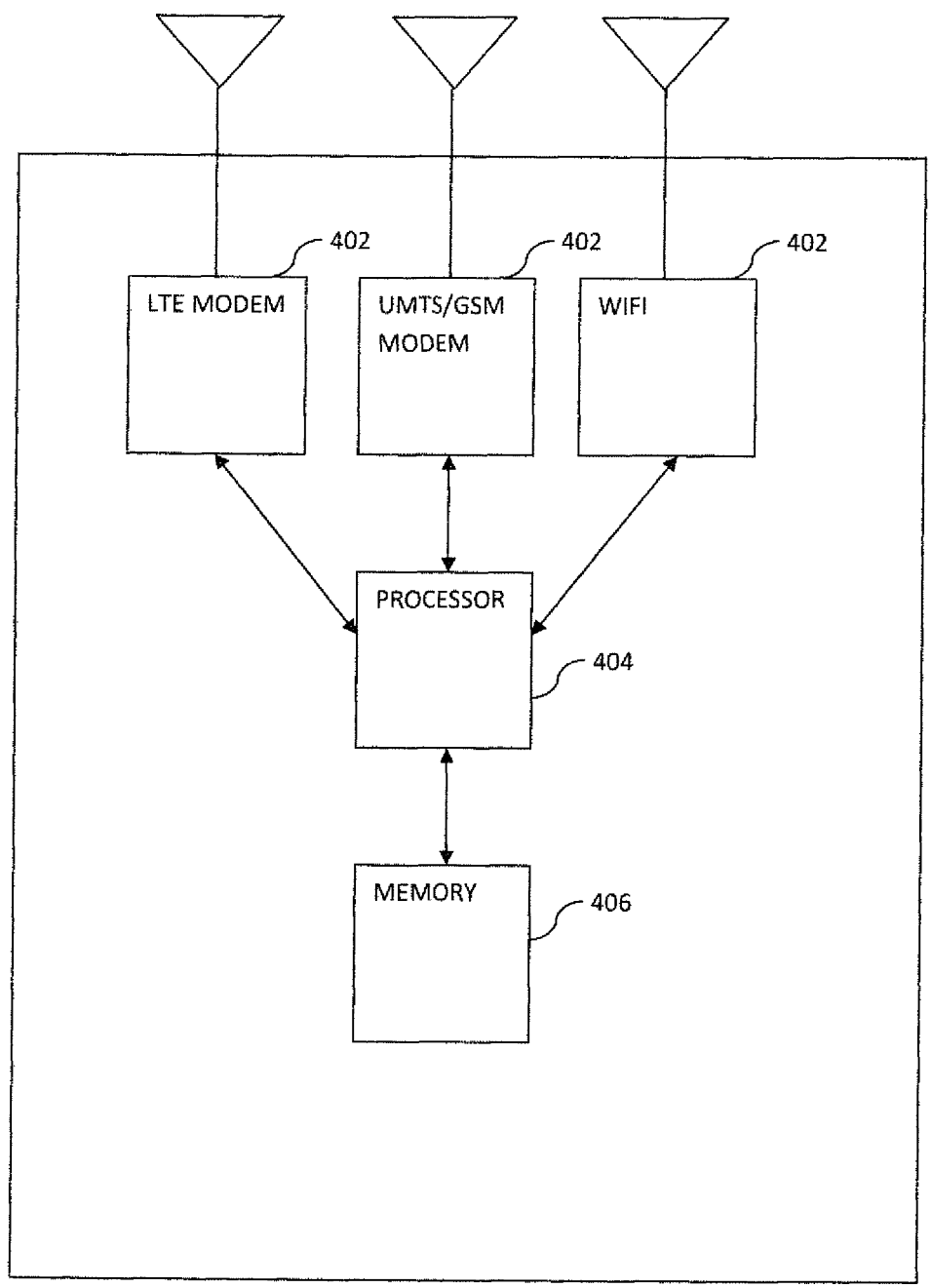
FIG. 4 is a functional block diagram illustrating one embodiment of a mobile wireless user device in accordance with the present disclosure.

Referring now to FIG. 4, an exemplary user device 400 for intelligently selecting device wireless access technology based on e.g., prevailing device and network operating conditions is illustrated. As used herein, the term "user device" includes, but is not limited to cellular telephones, smartphones (such as for example an iPhone™) wireless-enabled tablet devices (such as for example an iPad™), or any combinations of the foregoing. While one specific device configuration and layout is shown and discussed herein, it is recognized that many other configurations may be readily implemented by one of ordinary skill given the present disclosure, the apparatus 400 of FIG. 4 being merely illustrative of the broader principles described herein.

The apparatus 400 of FIG. 4 includes one or more transceivers 402, a processor 404 and a computer readable memory 406.

The processing subsystem 404 includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 406, which may include for example SRAM, FLASH, SDRAM, and/or HDD (Hard Disk Drive) components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. As shown processing subsystem 404 includes discrete components; however, it is understood that in some embodiments they may be consolidated or fashioned in a SoC (system-on-chip) configuration.

The processing subsystem 404 is adapted to receive one or more data streams from the one or more transceivers 402. The processing subsystem also includes logic (as described above) for implementing selective enabling/disabling of the one or more radio transceivers in accordance with the methods describe above. In one variant, this logic is implemented in software adapted to run on the processing subsystem, although it will be appreciated that hardware or firmware (or any combinations of the foregoing) may be used with equal success consistent with the principles described herein.

Myriad other schemes for intelligently selecting device wireless access technology will be recognized by those of ordinary skill given the present disclosure.

It will be recognized that while certain embodiments of the disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure.

While the above detailed description has shown, described, and pointed out novel features as applied to various embodiments, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A mobile apparatus, comprising:
a cellular wireless transceiver operable in at least a first mode and a second mode;
a processor in signal communication with the cellular wireless transceiver; and
computerized logic in communication with the processor and configured to cause the mobile apparatus to:
determine an operational state of the mobile apparatus;
when the operational state of the mobile apparatus is a first operational state, operate the cellular wireless transceiver in the first mode in accordance with a first set of system selection preferences; and
when the operational state of the mobile apparatus is a second operational state, operate the cellular wireless transceiver in the second mode in accordance with a second set of system selection preferences,
wherein the first and second sets of system selection preferences comprise one or more rules to select between a plurality of radio access technologies, the second set of system selection preferences excluding at least one radio access technology included in the first set of system selection preferences, and the operational state of the mobile apparatus comprises one or more of a display mode, a power mode of the processor, or an association of the mobile apparatus with a wireless local area network (WLAN).

2. The mobile apparatus of claim 1, wherein the first set of system selection preferences includes a radio access technology that supports a higher data rate transfer than any radio access technology in the second set of system selection preferences.

3. The mobile apparatus of claim 1, wherein the first set of system selection preferences consists of Global Standard for Mobile Communications (GSM), Wideband Code Division Multiple Access (WCDMA), and Long Term Evolution (LTE), and the second set of system selection preferences consists of GSM and WCDMA.

4. The mobile apparatus of claim 1, wherein the first set of system selection preferences consists of Global Standard for Mobile Communications (GSM), Enhanced High Rate Packet Data (eHRPD), and Long Term Evolution (LTE), and the second set of system selection preferences consists of GSM and eHRPD.

5. The mobile apparatus of claim 1, wherein the first operational state of the mobile apparatus comprises a normal power mode of the processor and the second operational state of the mobile apparatus comprises a low power mode of the processor, and the second set of selection preferences prioritizes reduced power consumption by the mobile apparatus.

6. The mobile apparatus of claim 1, wherein the second operational state of the mobile apparatus comprises the association of the mobile apparatus with the WLAN and the first operational state of the mobile apparatus comprises a lack of association of the mobile apparatus with any WLAN.

7. The mobile apparatus of claim 6, wherein the second operational state of the mobile apparatus further comprises verified connectivity for the mobile apparatus via the WLAN.

8. The mobile apparatus of claim 1 further comprising a display, wherein the first operational state of the mobile apparatus comprises an active display mode for the display including an on state of the display or an unlocked state of the display, and the second operational state of the mobile apparatus comprises an inactive display mode for the display including an off state of the display or a locked state of the display, and the second set of selection preferences prioritizes reduced power consumption by the mobile apparatus.

9. A method for selecting and operating radio access technologies within a mobile device comprising a processor, a cellular wireless transceiver, and computerized logic in communication with the processor, the method comprising:
    evaluating an operational state of the mobile device;
    when the operational state of the mobile device is a first operational state, operating the cellular wireless transceiver in a first mode in accordance with a first set of system selection preferences; and
    when the operational state of the mobile device is a second operational state, operating the cellular wireless transceiver in a second mode in accordance with a second set of system selection preferences,
    wherein the first and second sets of system selection preferences comprise one or more rules to select between a plurality of radio access technologies, the second set of system selection preferences excluding at least one radio access technology included in the first set of system selection preferences, and the operational state of the mobile device comprises one or more of a display mode, a power mode of the processor, or an association of the mobile device with a wireless local area network (WLAN).

10. The method of claim 9, wherein the second operational state of the mobile device comprises an association of the mobile device with the WLAN and verified connectivity for the mobile device via the WLAN, and the first operational state of the mobile device comprises a lack of verified connectivity for the mobile device via any WLAN.

11. The method of claim 9, wherein the first operational state of the mobile device comprises a normal power mode of the processor and the second operational state of the mobile device comprises a low power mode of the processor, and the second set of system selection preferences prioritizes reduced power consumption by the mobile device.

12. A wireless apparatus, comprising:
    a plurality of cellular wireless interfaces;
    communication selection logic configured to cause the wireless apparatus to automatically select one of the plurality of cellular wireless interfaces according to a system selection preference;
    a processor; and
    a non-transitory computer readable apparatus storing one or more instructions that, when executed by the processor, cause the wireless apparatus to:
        determine an operational state of the wireless apparatus;
        when the operational state of the wireless apparatus is a first operational state, set the system selection preference to a first configuration that reduces power consumption of the wireless apparatus; and
        otherwise, set the system selection preference to a second configuration,
    wherein the first and second configurations of the system selection preference comprise one or more rules to select between a plurality of radio access technologies, the first configuration excluding selection of at least one radio access technology included in the second configuration, and the operational state of the wireless apparatus comprises one or more of a display mode, a power mode of the processor, or an association of the wireless apparatus with a wireless local area network (WLAN).

13. The wireless apparatus of claim 12, wherein the first operational state of the wireless apparatus comprises a low power mode of the processor, the second operational state of the wireless apparatus comprises a normal power mode of the processor, and the first configuration of the system selection preference disallows selection of a Long Term Evolution (LTE) cellular wireless interface from the plurality of cellular wireless interfaces.

14. The wireless apparatus of claim 13, wherein the second configuration of the system selection preference allows selection of the LTE cellular wireless interface.

15. The wireless apparatus of claim 12, wherein the first configuration excludes selection of a highest data rate cellular wireless interface in the system selection preference.

16. The wireless apparatus of claim 12, further comprising a wireless local area network interface, wherein the first operational state comprises an association with the WLAN and verified connectivity for the wireless apparatus via the WLAN, and wherein the processor is configured to select the wireless local area network interface for data transactions when the system selection preference is set to the first configuration.

17. The method of claim 9, wherein the first set of system selection preferences includes a radio access technology that supports a higher data rate transfer than any radio access technology in the second set of system selection preferences.

18. The method of claim 9, wherein the first set of system selection preferences includes a Long Term Evolution (LTE) radio access technology, and the second set of system selection preferences does not include an LTE radio access technology.

19. The method of claim 9, wherein the mobile device includes a display, and wherein the first operational state comprises an active display mode for the display including an on state of the display or an unlocked state of the display, and wherein the second operational state comprises an inactive display mode for the display including an off state of the display or a locked state of the display, and the second set of selection preferences prioritizes reduced power consumption by the mobile device.

20. The mobile apparatus of claim 1, wherein the first set of system selection preferences includes a Long Term Evolution (LTE) radio access technology, and the second set of system selection preferences does not include an LTE radio access technology.

* * * * *